UNITED STATES PATENT OFFICE.

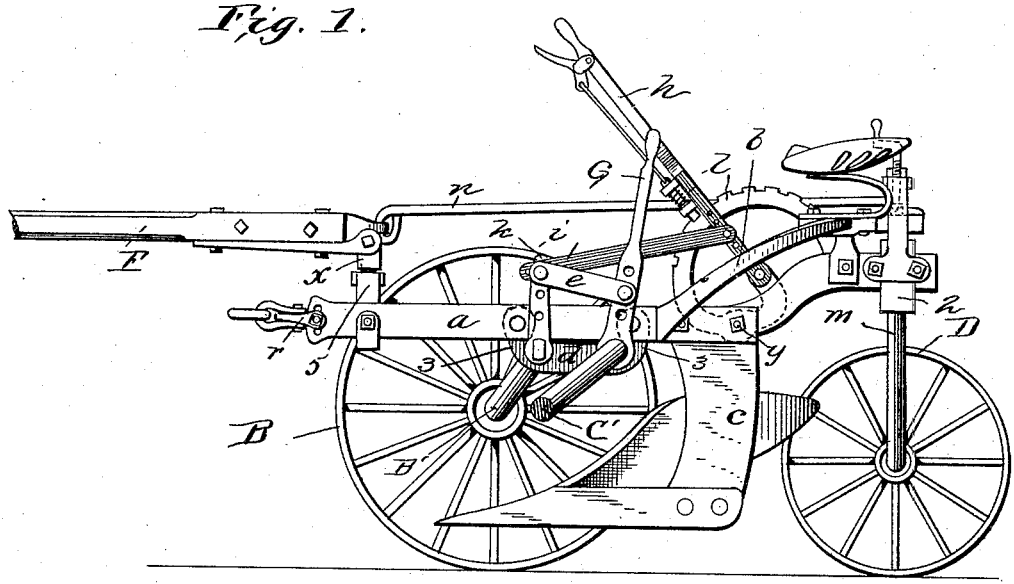

WILHELM GEORGE DANIELSON AND WILLIAM MERRILL, OF RICHMOND, UTAH TERRITORY.

SULKY-PLOW.

SPECIFICATION forming part of Letters Patent No. 430,423, dated June 17, 1890.

Application filed January 11, 1890. Serial No. 336,695. (No model.)

*To all whom it may concern:*

Be it known that we, WILHELM GEORGE DANIELSON and WILLIAM MERRILL, of Richmond, in the county of Cache and Territory of Utah, have invented a new and useful Improvement in Sulky-Plows; and we do hereby declare that the following is a full, clear, and exact description of the same.

Our invention is an improved sulky-plow, and in its construction we have aimed to reduce the number of parts, so as to simplify the plow and economize in the cost of manufacture without impairing its efficiency.

In the drawings, Figure 1 is a side elevation of the sulky-plow. Fig. 2 is a plan view of the same. Fig. 3 is a rear view. Fig. 4 is a detail view of the boxes or clips for supporting the shafts to the frame.

In the drawings, the frame-work of the plow is shown at A, and consists of an elongated central beam, to which is riveted an angular part $a$, extending approximately parallel to the main beam, being bent at right angles at its rear end and clamped to the said beam. Between the main beam and the frame $a$ is an extension $b$ of the frame, and upon this extension the driver's seat is adjustably supported. The same bolts which hold the end of the frame $a$ and the main beam together also pass through the plow-standard $c$, clamping the same securely between the frame $a$ and the main beam, so that the said plow is rigidly connected to the frame.

The carrying-wheels B C are supported upon independent shafts B' C', each having their outer ends bent. These shafts are supported by clips or boxes $d$, consisting of flat pieces of metal having upturned ends 3 3, Figs. 1 and 4, which are bolted to the sides of the frame. The horizontal portion of the clips have bearing-sockets for the shafts, which fit them, and thus between the clips and the edge of the frame, the latter being utilized as a portion of the box or bearing. The shaft of the wheel C has an operating-handle rigidly secured thereto, and this handle is in connection with the shaft of the wheel B by links $e$, the link $e$ having a pivoted connection to the shaft of the wheel B, so that by operating the lever G the said wheel C may be adjusted in height as desired. The wheels B C are in connection with the operating-lever $h$ by means of the link $i$, which is adjustably connected to the arm $k$, extending from the shaft of the wheel B, to which it is secured rigidly. The same bolt Y which secures the main beam, the frame $a$, and the plow-standard together also passes through the lower part of a segmental rack $l$, and the operating-lever is pivoted upon this rack, having the ordinary spring-pawl for engaging the teeth thereof. By the operation of this lever the shaft of the wheel B is turned to raise or depress the wheels B and C, and thus raise or depress the frame of the sulky, throwing the plow out of the ground or into it to the desired depth.

The furrow-wheel is shown at D, and is supported upon the horizontal extension of a spindle $m$, which is clamped between the holding-plates 2, supported upon the rear end of the main beam. The spindle has a swiveling movement between said plates, and is adapted to be moved laterally to aid in changing the direction of the plow through a connection with the tongue, this connection consisting of a long link $n$, connecting at the tongue end with a projection and at the opposite end with an extension $o$ of a segment $p$, this segment having pivotal movement on a stud $q$ upon the main frame. This segment $p$ is in mesh with a corresponding segment, which is splined to the end of the spindle of the furrow-wheel, and consequently as the tongue is drawn to the right in the movement of the horses in turning the plow the furrow-wheel is turned to the left through the connections described, and the sulky is thus easily turned when it is desired to change the direction of the movement of the plow, and the turn may be a very short one. The furrow-wheel is adjustable vertically, so as to regulate the depth of cut of the plow, and especially the forward part thereof, by means of a screw which is in connection with the end of the spindle and terminates in a handle, and thus by the movement of the said handle the spindle may be adjusted vertically. The tongue shown at F is adapted to have free movement, either to the right or left, by swiveled connection, consisting of a pin $x$, pivoted to the end of the tongue and swiveled in ears 5, connected to the frame of the plow. The clevis proper, which sustains the draft, is shown at $r$ and extends across the front of the frame.

It will be understood that we do not limit ourselves to the use of a single plow, as the same construction may be used with a gang-plow, if desired.

What we claim is—

1. In a sulky-plow, a frame, supporting-wheels, a plow connected to said frame, a furrow-wheel having a swiveled connection with the frame-work, segmental racks gearing into each other, one of said racks being connected to the spindle of the furrow-wheel, a tongue, and a connection between said beam and one of said segmental racks, substantially as described.

2. In combination, the frame, the wheels with their shafts, and the clips $d$, having upturned ends 3 3 secured to the frame, and bearing-sockets for the shafts, the said shafts bearing in said sockets and against the edge of the frame, substantially as described.

3. In combination, a frame with wheels and a plow and furrow-wheel, a tongue, a pin $x$, supported to rotate in bearings 5 on the frame, the said tongue being pivoted to move vertically on said pin, and a connection between the tongue and furrow-wheel, substantially as described.

In testimony whereof we have signed our names to this specification in the presence of two subscribing witnesses.

WILHELM GEORGE DANIELSON.
WILLIAM MERRILL.

Witnesses:
JOHN BÁRNETT,
M. W. MERRILL, Jr.